Aug. 6, 1946.   B. T. COLE   2,405,405
PICKER MECHANISM AND MACHINES, ESPECIALLY KNITTING
MACHINES, INCORPORATING SUCH MECHANISM
Original Filed July 14, 1942   5 Sheets-Sheet 5
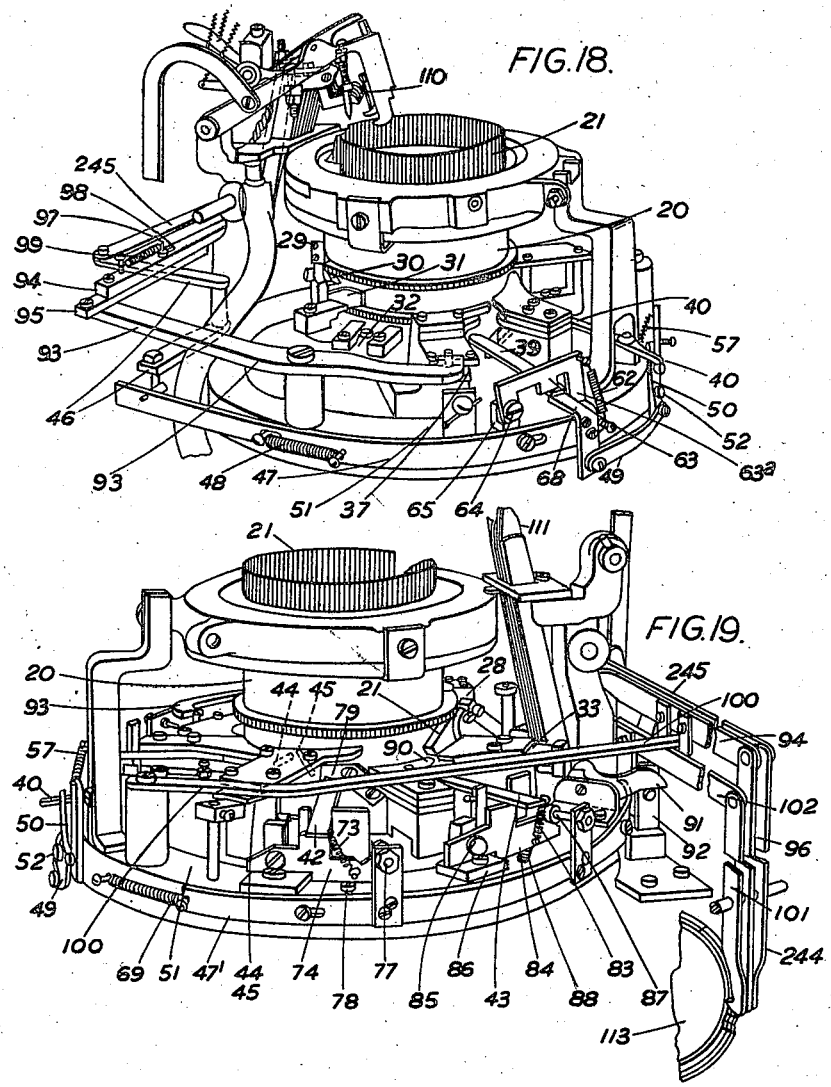
INVENTOR
BERNARD T. COLE
BY
ATTORNEY Patented Aug. 6, 1946

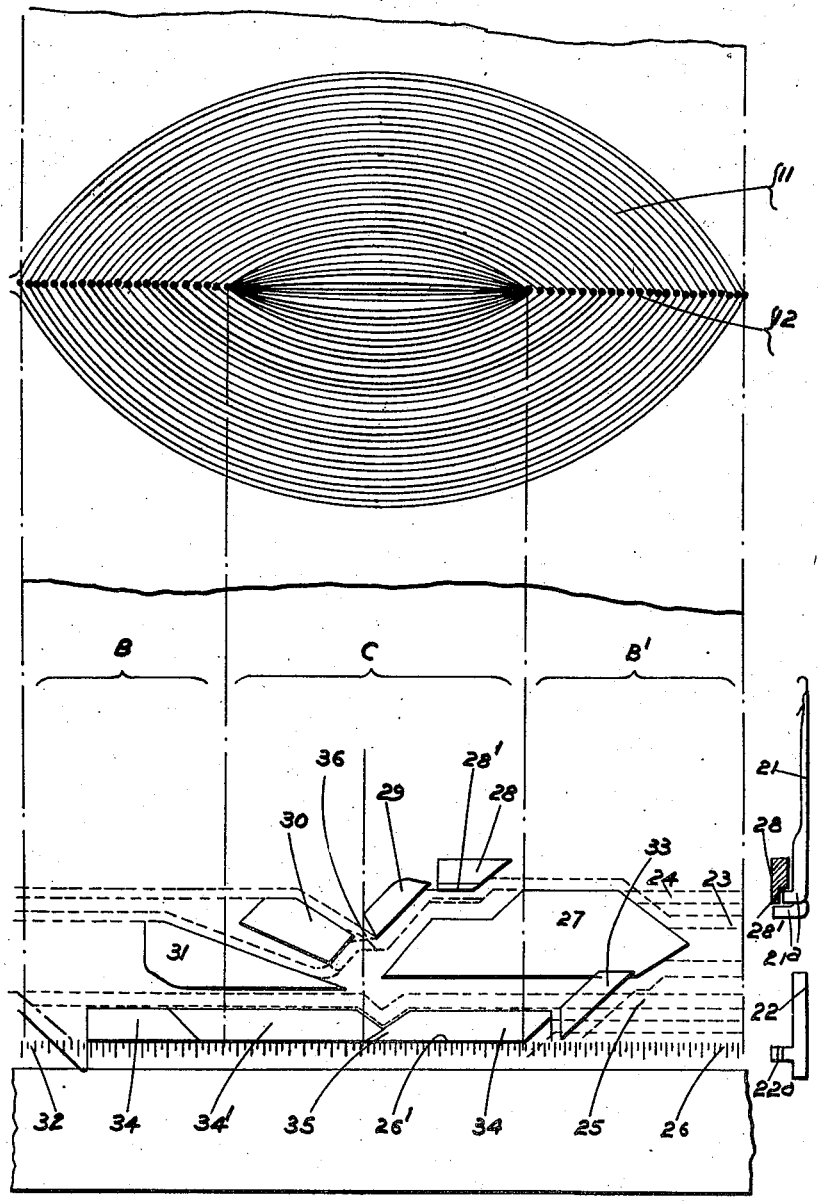

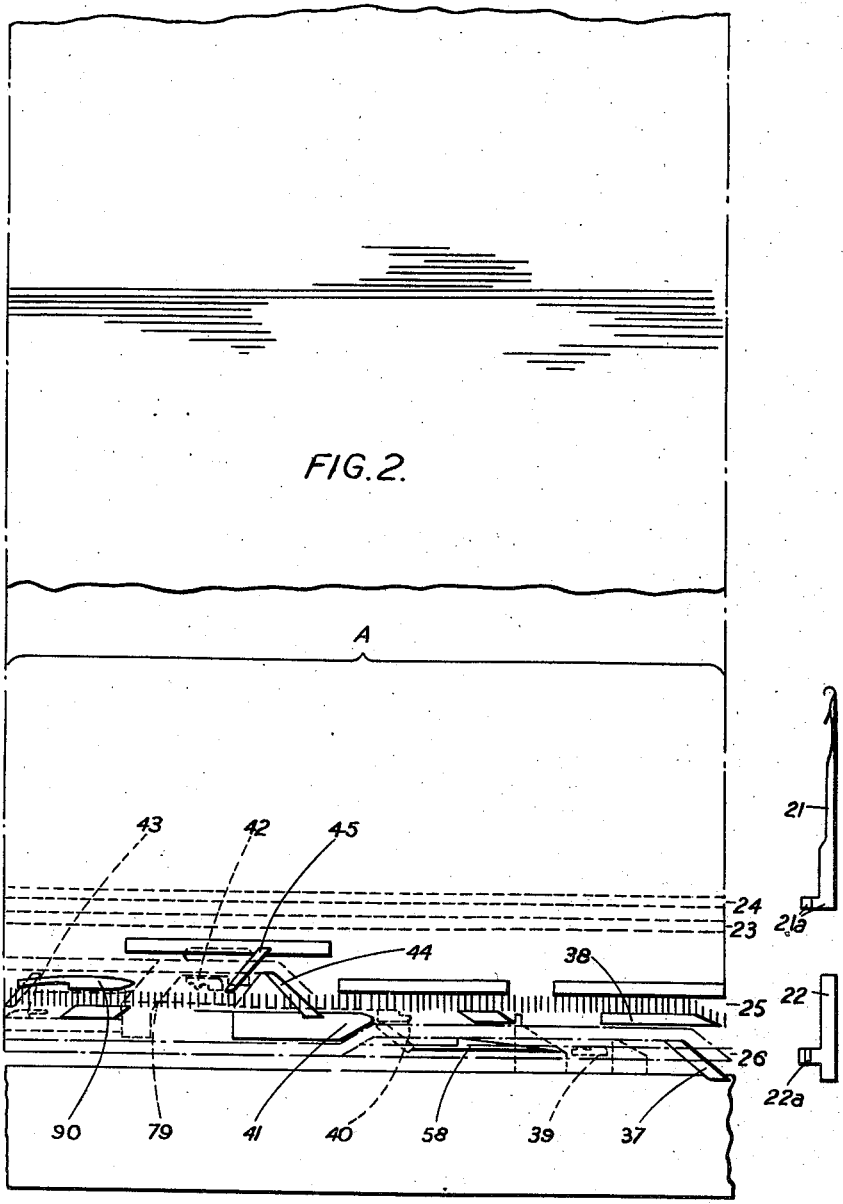

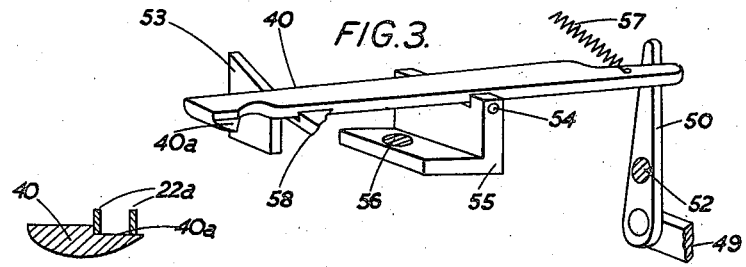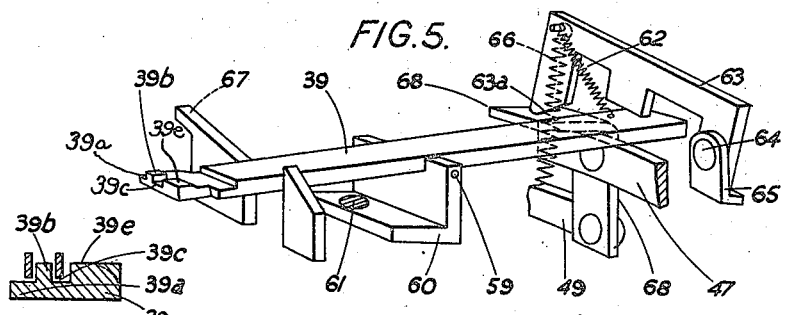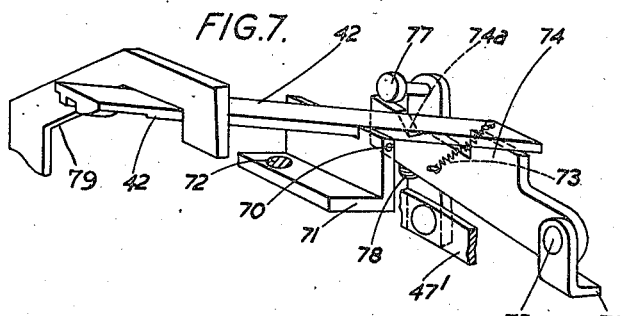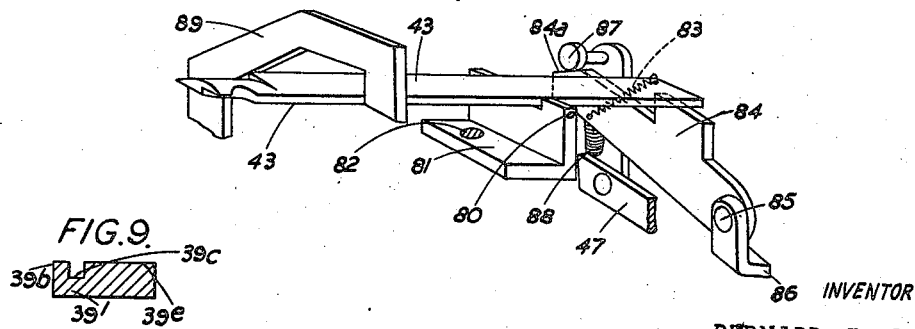

2,405,405

UNITED STATES PATENT OFFICE 2,405,405

PICKER MECHANISM AND MACHINES, ESPECIALLY KNITTING MACHINES, INCORPORATING SUCH MECHANISM

Bernard Thornton Cole, Burbage, England, assignor to B. Toone (Nottingham) Limited, Nottingham, England Original application July 14, 1942, Serial No. 450,922, now Patent No. 2,372,554, dated March 27, 1945. Divided and this application September 16, 1942, Serial No. 458,542. In Great Britain October 20, 1941

13 Claims. (Cl. 66—48)

The present invention is concerned with improvements in and relating to picker mechanism and machines, especially knitting machines, incorporating such mechanism. Picker mechanism is herein defined as mechanism operable, on individually movable instruments of a line thereof mounted in a bed and provided with butts or equivalent shoulders (hereinafter referred to as butts), to displace said instruments one by one or in small groups at successive operations of the mechanism, relative movement being effected between the mechanism and the bed along the line of the instruments and each instrument being displaced by limited movement of a picking member of the mechanism in the general direction in which the instruments are displaceable in said bed. Picking mechanism as commonly constructed heretofore is capable of operating at the leading end of a line of instruments, and an important object of the present invention is to provide picking mechanism which is capable of picking at the rear end of a line of instruments. This mechanism is particularly, but not exclusively, adapted for use in a knitting machine according to my co-pending U. S. patent application No. 450,922, filed July 14, 1942, now Patent No. 2,372,554, granted March 27, 1945, of which this application is a division, and other features of this invention are concerned with the said machine and with its mode of operation.

The picking mechanism according to the present invention comprises a slide part or feeler for travelling along a line of butts to drop in behind the last one thereof, a driving catch connected to the slide part to engage temporarily in front of one of the butts when the slide part drops in so as to be driven by the said butt in the direction of relative movement between the bed and the mechanism, and a picking member driven by the catch to make a picking movement. Preferably this picking member picks at least that butt which is engaged with the catch. The slide part, catch and picking member may be mounted on a pivoted arm or arms. Alternatively they may be mounted to move along a suitably shaped track or race.

The present invention further includes picker mechanism for operating on butts of a line thereof by relative movement, lengthwise of said line, between the butts and the mechanism, comprising a driving member for engagement in front of a butt to be picked and for displacement thereby, a picking member for picking said butt on said displacement, and a positioning surface for engaging with the butts as said relative movement occurs and for thereby preventing engagement of the driving member until said relative movement terminates the engagement between the butts and the positioning surface.

The foregoing and other features of the invention set out in the appended claims are incorporated in the construction which will now be described in detail with reference to the accompanying drawings, in which Figure 1 shows the development of the portion of the knitting cams in a circular knitting machine, incorporating the invention, for producing seamless hose and the like, and above it shows a pouch, e. g. a heel pouch;

Figure 2 is a continuation of Fig. 1 showing certain cams and pickers, and alongside said cams a view of a needle and a jack;

Figure 3 is a perspective view of a leading up-picker, while Figure 4 is cross-sectional view thereof which also illustrates the shape of the end of a leading down-picker;

Figure 5 is a perspective view of a trailing up-picker, while Figure 6 is cross-sectional view thereof which also illustrates the shape of the end of a trailing down-picker;

Figure 7 is a perspective view of a trailing down-picker;

Figure 8 is a perspective view of a leading down-picker;

Figure 9 shows a cross section of a modified trailing picker;

Figures 14, 15 and 16 and 17 show the operations on half butts; while

Figures 18 and 19 are perspective views of the relevant parts of the head of the knitting machine, looking from opposite sides thereof.

Figure 10:
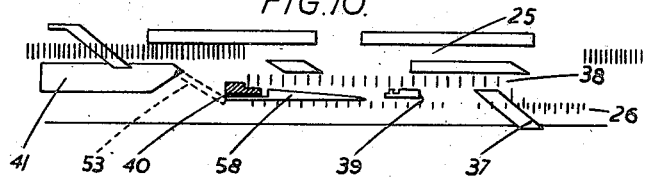
Figures 10 and 11 show the operation of the up-picker of Figs. 3 and 4 in picking up three-quarter butts from the leading end of an active group of heeling needles during narrowing.

The invention is described with reference to a circular knitting machine according to my said co-pending U. S. patent application No. 450,922 for producing pockets such as heel and toe pockets by rotary knitting in a rotationally-knitted and substantially tubular article such as a half-hose, and for further details of the machine reference is to be made to the said application, since in the present specification only those features which are of importance in understanding the present invention are described.

The rotatable needle cylinder 20 (Figs. 18 and 19) is provided with a circular series or full complement of needles 21 having alternate long and short butts 21a (Figs. 1 and 2) and beneath each needle in the same trick there is a jack 22 the butts 22a of which are of contrasting length also. The jacks beneath the instep needles A all have long butts 22a (Fig. 2); the jacks beneath the needles B and B' have alternate three-quarter and short butts, while the jacks beneath the needles C have either alternate three-quarter and short butts or all have three-quarter butts (Fig. 1). It is these jacks which are employed to effect the progressive reciprocal exchange of needles between loop-holding inactivity and knitting activity. During tubular knitting the needle butts 21a follow an active track 23, the needles clear at the clearing cam 27 and the butts descend a guard cam 28 to the stitch cams 29 and 30, being again elevated by cam 31. The lower edge of the cam 28 has a rebate 28' which is arranged to miss the short needle butts. Thus every second needle is lowered by cam 28 to a slightly greater extent than every intervening needle. This affects a division which (during the production of a pouch, or splicing) permits the feeding eye of the yarn feeder 110 (Fig. 18) to move between the needles into and out of operative position, the yarn being taken by the needles as their butts descend cam 29. During tubular knitting the butts 22a of all the jacks traverse a low track 26' below the knitting cams just mentioned and below guard cam 34, but the long butt jacks of the instep needles A are engaged by a cam 32 and are raised to a track 25 from which they are lowered to track 26 by bolt cam 33 underneath the clearing cam 27. The three-quarter and short butts of the jacks pass said cam 32 and remain in track 26.

Figure 11:
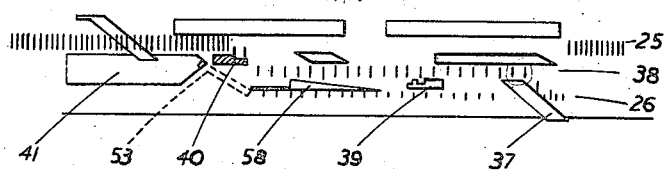
Figure 12:
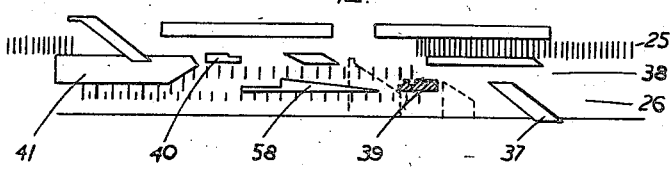
Figures 12 and 13 show the operation of the up-picker of Figs. 5 and 6 in picking up three-quarter butts from the trailing end of said group.
Figure 13:
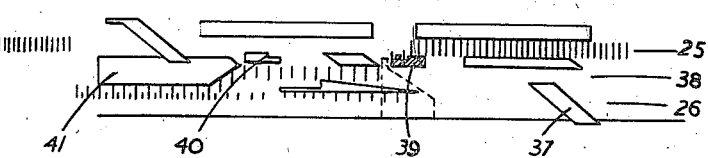

At the commencement of a pocket (such as that indicated at 11 in Fig. 1) the bolt cam 33 is withdrawn so that the long butt jacks continue along the track 25 over guard cam 34 which is arranged beneath the knitting cams. This cam has a V-shaped recess 35 immediately below the low point of cam 29. As the needles A descend cam 29 they are lowered on to the jacks 22 and the latter are caused to pass down to the bottom of the recess 35, but as the jack butts travel up the further slope of the V the needles are raised and their butts are passed up a gap 36 between the cams 29, 30, the said butts being raised by said cam 30 to a loop-retaining idle track 24. Thus all the instep needles are caused to hold their loops, the other needles continuing down cam 30 to knit. The bolt cam 37, Fig. 2, is also inserted to a sufficient extent to engage the three-quarter butts of the jacks B, B', and to raise them to a picking level indicated at 38, the short jack butts passing said cam 37. Thus the division is effected between odd and even jacks of needles B, B'. The division is cancelled by cam 41 and the first course of the pouch proper is knitted on needles B, B', after which the division is again made. The three-quarter butt jacks elevated to the picking level 38 (which may be considered to be the odd jacks) are then operated on by up-pickers 39 and 40. The picker 40 picks up the first two three-quarter butts of the group B from level 38 to level 25 as shown in Figs. 10 and 11 and the picker 39 picks the last two three-quarter butts of group B' from level 38 to level 25 as shown in Figs. 12 and 13, so that the four needle butts associated therewith are caused to pass up the gap 36 and the picked needles hold their loops in the second course.

Figure 14:
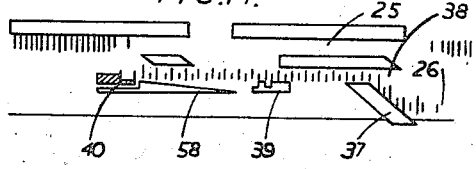
Figure 15:
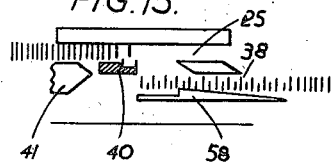
Figure 16:
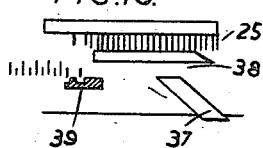
Figure 17:
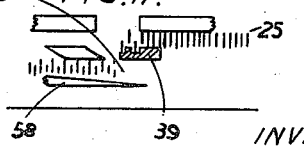

That is to say, the first and third needles at each end of the pouch needles are selected to hold their loops. The cam 37 is now pushed right in to raise all the jack butts of active needles to picking height 38, said butts being lowered by cam 41. After the third course has been knitted in this manner the pickers 39, 40 are again rendered operative to pick the first two short butts (Figs. 14 and 15) and the last two short butts (Figs. 16 and 17). That is to say, the butts associated with the second and fourth needles from each end of the group of heeling needles then active are picked. Cam 37 is now withdrawn to miss the short butts and the fourth course is knitted on the remaining active pouch needles. This sequence of picking is continued until all the needles B and B' have been moved to the loop-holding track.

The sequence of picking is therefore needles 1 and 3; 2 and 4; 5 and 7; 6 and 8 and so on, the odd numbered needles being those whereof the jacks 22 have three-quarter butts and the even needles those whereof the jacks have half butts. As a result at certain courses during the narrowing of the pouch there is an overlap of at least one needle between the inactive loop-holding needles and the active pouch knitting needles. For example during the knitting of the second course of the series the third needle is inactive and the second and fourth needles are active with the result that a series of thread loops are accumulated as knops on the third needle (such loops being actually accumulated on the third, seventh and eleventh, etc., needles).

The selected thread feeder such as 110 is controlled by one of the thrust rods 111 in known manner and moves into operation as the first of the active pouch knitting needles approaches the knitting cams and out of operation as the last of said active needles leaves the knitting cams, and the float thread at each course is either cut subsequently or the withdrawn thread is cut immediately whereby loose ends are produced at the suture lines 12.

After all the needles B, B', have been moved to the loop-holding position it is necessary to re-introduce them progressively into activity. They are re-introduced in the same sequence by down pickers 42, 43; that is to say, the picking sequence is 1 and 3, 2 and 4, etc., at the leading end of group B' and at the trailing end of group B. At least one course is knitted on the remaining active needles C, the cam 37 being withdrawn to miss the three-quarter butts. Dividing cams 44 and 45 are pushed part-way in and remain for two courses. The cam 44 raises the long and three-quarter butts from track 25; the long butts are immediately returned by cam 45 but the three-quarter butts continue until lowered by cam 27 and by the action of the needles descending cams 28 and 29. The short butts miss the cam 44 and continue at the down-picking level in track 25. In the second of these two courses the down-pickers 42, 43 are rendered operative to pick the last two short butts associated with needles B and the first two short butts associated with needles B' down to the track 26. As a result the associated needles descend the cam 30 and are re-introduced into knitting activity. For the third and fourth courses of the series of four courses cams 44, 45 are retracted to miss the three-quarter jack butts so that the three-quarter and half butts continue at the picking level 25. In the third course the down pickers 42, 43 are inactive, but they are rendered active after the fourth course has been knitted to pick down respectively the last two three-quarter butts of the jacks of group B and the first two three-quarter butts of the jacks of group B'. This four-course sequence continues until all pouch needles are re-introduced into knitting activity when the widening pickers 42, 43 are rendered inactive and the cam 33 is re-introduced to lower the long butt jacks so that the instep needles of group A are again rendered active and tubular knitting proceeds.

It will of course be understood that during this widening of the heel the thread is introduced and withdrawn in the same manner as during the narrowing.

Reference will now be made to the construction of the leading end pickers 40 and 43 and the trailing end pickers 39 and 42 (Figs. 3–6). Fig. 4 is an enlarged view of the picking end of picker 40. It will be seen that it is provided with a ledge 40a of sufficient length to receive two of the jack butts 22a and, being driven by the first of said butts, operates in the well-known manner. Down picker 43 is of substantially similar construction as may be seen from Fig. 8, and Fig. 4 may be considered to be an inverted view thereof. Fig. 6 is an enlarged view of the picking end of the trailing up-picker 39. It will be seen that this picker comprises a ledge 39a constituting the picking means, which ledge is of sufficient width to receive at least one of the jack butts; a driving lug or catch 39b adapted to enter between two consecutive butts at the picking level (which, owing to the division illustrated in Fig. 12, is equivalent to that between two odd or even butts); a recess 39c to accommodate at least one butt (including the trailing end butt), and a platform 39e (the feeler means or positioning surface aforesaid) for riding on the underside of the line of butts passing said picker, the butt-engaging surfaces of the ledge 39a, the recess 39c, and the platform 39e being presented in one and the same direction. The operation of the picker mechanism is as follows: When the picker is rendered operative the feeler platform 39e, under the bias of a spring 66 hereinafter mentioned, rises against the underside of the butts which pass along over it and prevent the picker operating until the last two butts, travelling from right to left, arrive at the position in which they are shown in Fig. 12. Since these butts no longer bear on the positioning surface or platform 39e the picking extremity of the picker springs upwards and the lug or catch 39b thereupon enters between said butts and these butts drive the picker to make its picking movement. The end of the down picker 42 is of substantially similar inverted construction as may be seen from Fig. 7.

In the modified trailing picker illustrated in Fig. 9 the ledge 39a is omitted but the driving lug or catch 39b, the butt recess 39c, and the platform 39e are retained. This picker is therefore adapted to pick the last butt only. Obviously the width of the recess 39c may be made sufficient to accommodate any practicable number of butts. This Fig. 9 may be taken as showing also an inverted view of a trailing down-picker and further details of said trailing up-pickers and down-pickers are shown in Figs. 5 and 7. The leading pickers are as shown in Figs. 3, 4 and 8, with this difference that the ledge is of sufficient width to accommodate one butt only. Using such pickers in the production of a pocket the modified picking sequence is 2, 1, 4, 3, 6, 5, etc.

The up-pickers 39 and 40 are shown in their inoperative position in Fig. 2. They are controlled from the drum 113 by lever 244, link 245 and bell-crank-lever 46 which slides a ring 47 against the action of a spring 48 (Fig. 18). This ring is connected by link 49 to a lever 50 pivoted to the platform 51 at 52. Movement of the ring 47 to the right, Fig. 18, rocks the lever 50 and causes the leading picker 40 to swing horizontally about pivot 56 and move up guide cam 53 to the inoperative position, the said picker being pivoted at 54 to a block 55 which is itself pivoted to the platform at 56. When the ring 47 is moved to the left the spring 57 pulls the picker down the cam 53 to its operative position resting on guide cam 58, where it is ready to pick the first two butts meeting it. The trailing picker 39 is likewise pivoted at 59 to a block 60 pivoted to the platform 51 at 61. Its outer end is connected by spring 62 to an E-shaped lever 63 which is pivoted at 64 to a bracket 65 on the platform 51 and which is drawn downwards by a tension spring 66. The said lever 63 rests on the outer end of picker 39 and holds the picking end thereof in the operative position in which the spring 66 biases it upwards against the underside of the butts and in which, when the projection 39b engages between the butts, the said picker is free to swing up the guide cam 67 against the tension of spring 62. When the ring 47 is moved to the right, Fig. 18, a wedge 68 thereon is inserted beneath the lower end 63a of one arm of the E-shaped lever 63 and the latter is raised as shown in Fig. 5 so that the spring 62 causes the picking end of picker 39 to be lowered to its inoperative position.

The down pickers 42, 43 are controlled by a similar ring 47', drawn towards the left in Fig. 19 and the right in Figs. 7 and 8 by spring 69, and controlled from the drum 113 by lever 101 and link 102. Trailing down-picker 42 is pivoted at 70 to block 71 which is pivoted at 72 to the platform 51, and the outer end of the picker is connected by tension spring 73 to a lever 74 pivoted at 75 to a lug 76 on said platform. Movement of the ring 47' to the right in Fig. 7 brings a headed pin 77 carried by the ring over a V-shaped slot 74a in lever 74 so that the latter is free to rise under the influence of a compression spring 78 whereby the outer end of the picker 42 is freed upwards and the picking end thereof is lowered to picking position in which it is biased by spring 78 against the upper surface of the row of butts. Thus when the picker engages a butt it swings on its pivots 70, 72 and travels obliquely downwards along the face of guide cam 79 against the tension of spring 73. The leading down-picker 43 is likewise pivoted at 80 to a block 81 pivoted to the platform 51 at 82. Its outer end is connected by a tension spring 83 to a lever 84 pivoted at 85 to lug 86 on the platform 51. Movement of the ring 47' to the right (Fig. 8) carries a headed pin 87 on the ring into engagement with an inclined face 84a on the lever 84 and lowers the said lever against the action of compression spring 88 so that by the action of the spring 83 the picking end of the picker 43 is pulled upwards to its operative position underneath a guard cam 90 (Figs. 2 and 19). In that position the picker is free to pick obliquely down the face of guide cam 89.

The cam 33 is arranged to be pushed inwards by a bell-crank-lever 91 and push rod 92, Fig. 19, operated from the drum 113. The dividing cam 37 is pushed inwards by lever 93, Fig. 18, bars 94 and 95 operated by lever 96 from said drum 113. A pin 97 protrudes from the bar 95 through a slot 98 in bar 94 and is connected to said bar 94 by spring 99. When the lever 96 is moved by the first half of a stepped cam on drum 113 the spring 99 is sufficiently strong to carry bar 95 with it and to rock lever 93 to push in the cam 37. Further movement of the bar 94 on the second half of the stepped cam introduces cams 44 and 45 by means of a lever 100 (Fig. 19).

I claim:

1. A picker mechanism for knitting machines or the like which have a line of instruments each provided with a butt, said instrument line and picker mechanism being mounted for relative movement between them longitudinally of the line: said mechanism comprising feeler means engageable with said butts to drop in behind the last one thereof; driving means temporarily disposable in front of one of the butts when the feeler means drops in as aforesaid, whereby to be displaced by such butt; and picking means displaceable by said driving means to make a picking movement.

2. Mechanism according to claim 1, wherein the picking means is arranged to pick a butt in advance of that engaged by the driving means.

3. A picker mechanism for knitting machines and the like having a line of instruments each of which is provided with a butt whereby it may be moved longitudinally of itself: said mechanism comprising an arm movably mounted adjacent said instrument line and having a portion engageable with one of said butts whereby the arm may be moved thereby upon relative movement occurring between the arm and instrument line longitudinally of the latter; said arm also having a portion engageable by the butt of at least one of said instruments for picking the latter upon said arm movement, and a further portion engageable with at least a plurality of said butts for preventing said moving and picking engagements by all of the butts except those at the rear end of the line.

4. A picker mechanism for knitting machines and the like having a line of instruments each of which is provided with a butt whereby it may be moved longitudinally of itself: said mechanism comprising an arm pivotally mounted adjacent said instrument line and having a lug engageable by the butt of one of said instruments whereby the arm may be swung upon its pivot upon relative movement occurring between the arm and the instrument line longitudinally of the latter, and thereby pick said instrument; said arm also having a surface engageable with at least a plurality of said instrument butts to prevent said arm-moving and picking operations by all of the butts except those at the rear end of the line.

5. Mechanism according to claim 4, incorporating means for picking a butt in advance of that engaged by said lug.

6. Picking mechanism for picking butts or equivalent shoulders provided on a line of individually-movable instruments mounted in a bed, relative movement along said line taking place between the bed and the mechanism and the butts following one another in a row, which mechanism comprises an arm having a picking extremity for engaging the butts, said arm being mounted for pivotal picking displacement of said extremity, by a butt, obliquely of said relative movement; said extremity being provided with a catch for engagement in front of a butt whereby the arm is driven to make said oblique picking movement, and with a positioning surface for resting on the butts and thereby preventing said engagement of the catch until said relative movement carries the butts out of contact with said surface; means biasing said arm against said oblique picking movement; and means biasing the positioning surface against the butts and the catch into engagement.

7. Picker mechanism for picking butts or equivalent shoulders from the trailing end of a row thereof on a line of individually-movable instruments mounted in a bed between which and said mechanism relative movement takes place lengthwise of said line in such manner that said row of butts and the mechanism pass each other repeatedly, which mechanism comprises a picking member having a butt-receiving recess and a catch for engagement in front of a butt at the trailing end of said row and for displacement by said butt, thereby removing said butt from said trailing end, said picking member also having a portion for engaging said butts and for preventing engagement of the catch until the last butt of the row passes said feeler, whereby at successive operations the last butt, for the time being, of the row is picked and the picking operations progress forward from the trailing end.

8. In a machine having an instrument bed, a line of individually-movable instruments therein and a row of projections on said instruments; picker mechanism, between which and said bed relative movement takes place along said line whereby the row of projections and the mechanism pass one another repeatedly, for picking at each of successive passes the last projection, for the time being, of said row whereby the picking operations progress forwards from the trailing end of the row, which mechanism comprises a picking member for picking the said last projection for the time being, and means controlled by said projections for preventing operation of said picking member until the said last projection passes out of range of said means.

9. A machine according to claim 8, wherein the projection-controlled means comprises a surface on the picking member for engaging the row of projections in said relative movement and for displacement when said engagement is terminated by said relative movement, and wherein the picking member is also provided with a lug movable on said displacement into engagement in front of a projection for displacement by the latter to drive the picking member.

10. In a circular knitting machine having a needle bed, a line of individually-movable needles therein, and a row of butts associated with said needles; pouch-forming mechanism for controlling said needles in the production of a pouch which mechanism includes picker mechanism, between which and the needle bed relative rotation takes place, for successively picking butts from the trailing end of the row thereof and which picker mechanism comprises a picking member for picking the last butt for the time being, said member having means operable by engagement in front of a butt to drive the member, and means for contacting the butts and preventing said engagement of the driving means until the relative rotation terminates contact between said butts and contacting means.

11. A machine according to claim 10, wherein the pocket-forming mechanism includes two such picker mechanisms for picking in opposite directions and each operating at the trailing end of a row of butts, and two other picker mechanisms for picking in opposite directions and each operating at the leading end of a row of butts.

12. A machine according to claim 10, having means operating in certain courses for directing all the butts at a picking level past the picker mechanism and for dividing the butts in courses alternating therewith and for directing alternating butts at the picking level and at a non-picking level.

13. Picker mechanism for operating on the butts of a line of knitting machine instruments by relative movement between said mechanism and line in a direction lengthwise of the latter: which picker mechanism comprises driving means disposable in front of a butt to be picked for displacement thereby; means for picking said butt upon such displacement; feeler means engageable with the butts during said relative movement, whereby to prevent actuation of said driving means until said relative movement terminates the engagement between the butts and the feeler means, which picking means and feeler means have butt-engaging surfaces presented in one and the same direction; spring means biasing the feeler means to engage the butts with its said surface; and means pivotally mounting said driving, picking, and feeler means for movement in unison.

B. T. COLE.